US012658329B2

(12) United States Patent
Hu et al.

(10) Patent No.: US 12,658,329 B2
(45) Date of Patent: Jun. 16, 2026

(54) METHOD FOR CONTROLLING PLASMA EDGE FUEL PARTICLE BACKFLOW BY POWDER FEEDBACK INJECTION

(71) Applicant: Hefei Institutes of Physical Sciences, Chinese Academy of Sciences, Hefei (CN)

(72) Inventors: JianSheng Hu, Hefei (CN); GuiZhong Zuo, Hefei (CN); Ming Huang, Hefei (CN); Wei Xu, Hefei (CN); Zhe Wang, Hefei (CN); JingSheng Yuan, Hefei (CN); YanHong Guan, Hefei (CN); HuiDong Zhuang, Hefei (CN); Kai Wu, Hefei (CN); Yao Huang, Hefei (CN); Bin Cao, Hefei (CN); XianZu Gong, Hefei (CN); YunTao Song, Hefei (CN)

(73) Assignee: Hefei Institutes of Physical Sciences, Chinese Academy of Sciences, Hefei (CN)

( * ) Notice: Subject to any disclaimer, the term of this patent is extended or adjusted under 35 U.S.C. 154(b) by 0 days.

(21) Appl. No.: 18/945,340

(22) Filed: Nov. 12, 2024

(65) Prior Publication Data

US 2025/0191791 A1 Jun. 12, 2025

(30) Foreign Application Priority Data

Dec. 11, 2023 (CN) ........................ 202311688116.4

(51) Int. Cl.
*G21B 1/15* (2006.01)
*G21B 1/11* (2006.01)
*G21B 1/13* (2006.01)

(52) U.S. Cl.
CPC ................. *G21B 1/15* (2013.01); *G21B 1/11* (2013.01); *G21B 1/13* (2013.01)

(58) Field of Classification Search
CPC .................................. G21B 1/13; G21B 1/15
See application file for complete search history.

(56) References Cited

U.S. PATENT DOCUMENTS 4,344,911 A 8/1982 Maniscalco et al.

FOREIGN PATENT DOCUMENTS

CN 202487182 U 10/2012
CN 104409108 A 3/2015
(Continued)

OTHER PUBLICATIONS

Maingi, R., et al. "ELM elimination with Li powder injection in EAST discharges using the tungsten upper divertor." Nuclear Fusion 58.2 (2018): 024003. (Year: 2018).*
(Continued)

*Primary Examiner* — Sharon M Davis
(74) *Attorney, Agent, or Firm* — Seed IP Law Group LLP

(57) ABSTRACT

The present disclosure discloses a method for controlling plasma edge fuel particle backflow by powder feedback injection, including: measuring a real-time Da value by a visible spectrum diagnostic system; in the plasma control system, filtering the measured Da value by a low-pass filter, and setting a target Da value at the same time; when an actual Da value is greater than the set target Da value, calculating an output control voltage signal; wherein the magnitude of the output voltage ultimately determines the magnitude of the lithium powder injection flow rate; converting a voltage signal input by the plasma control system into a sine wave signal by the amplitude mapping converter, and outputting same to the lithium powder injection system; and receiving the voltage signal and injecting the lithium powder into the fusion device by the lithium powder injection system; wherein the injected lithium powder adsorbs the fuel particles generated by the interaction between the
(Continued)

plasma and the wall, so that the backflow of the fuel particles is reduced. In the present disclosure, the flow rate of the powder injection is automatically adjusted according to the real-time recycling level during the plasma discharge process so as to achieve real-time control of the fuel recycling.

3 Claims, 1 Drawing Sheet

(56) References Cited

FOREIGN PATENT DOCUMENTS

| | | | |
|---|---|---|---|
| CN | 111081389 | A | 4/2020 |
| EP | 1345238 | A2 | 9/2003 |
| JP | 2012007989 | A | 1/2012 |

OTHER PUBLICATIONS

Nagy, A., et al. "A multi-species powder dropper for magnetic fusion applications." Review of Scientific Instruments 89.10 (2018). (Year: 2018).*

Nespoli, F., et al. "First impurity powder injection experiments in LHD." Nuclear Materials and Energy 25 (2020): 100842. (Year: 2020).*

Sun, Z., et al. "Real time wall conditioning with lithium powder injection in long pulse H-mode plasmas in EAST with tungsten divertor." Nuclear Materials and Energy 19 (2019): 124-130. (Year: 2019).*

Andruczyk, D., et al. "Overview of lithium injection and flowing liquid lithium results from the US-China collaboration on EAST." Physica Scripta 2020.T171 (2020): 014067. (Year: 2020).*

D. K. Mansfield et al., "A Simple Apparatus for the Injection of Lithium Aerosol into the Scrape-Off Layer of Fusion Research Devices," Princeton Plasma Physics Laboratory, Oct. 2010, 12 pages.

Hu Jiansheng et al., "Brief Review of the Interactions Between Plasma and Walls in Magnetic Controlled Fusion Devices," Journal of University of Science and Technology of China, vol. 50, No. 9, Sep. 2020, 25 pages.

Yaowei Yu et al., "Fuel Recycling Control in Long Pulse Operation with Full Tungsten Divertors in EAST Tokamak," Nuclear Materials and Energy, 2023, 8 pages.

Zhang Ling et al., "The Study of Visible Radiation of EAST Tokamak Plasma," Progress Report on China Nuclear Science & Technology, vol. 1, Nov. 2009, 6 pages.

* cited by examiner

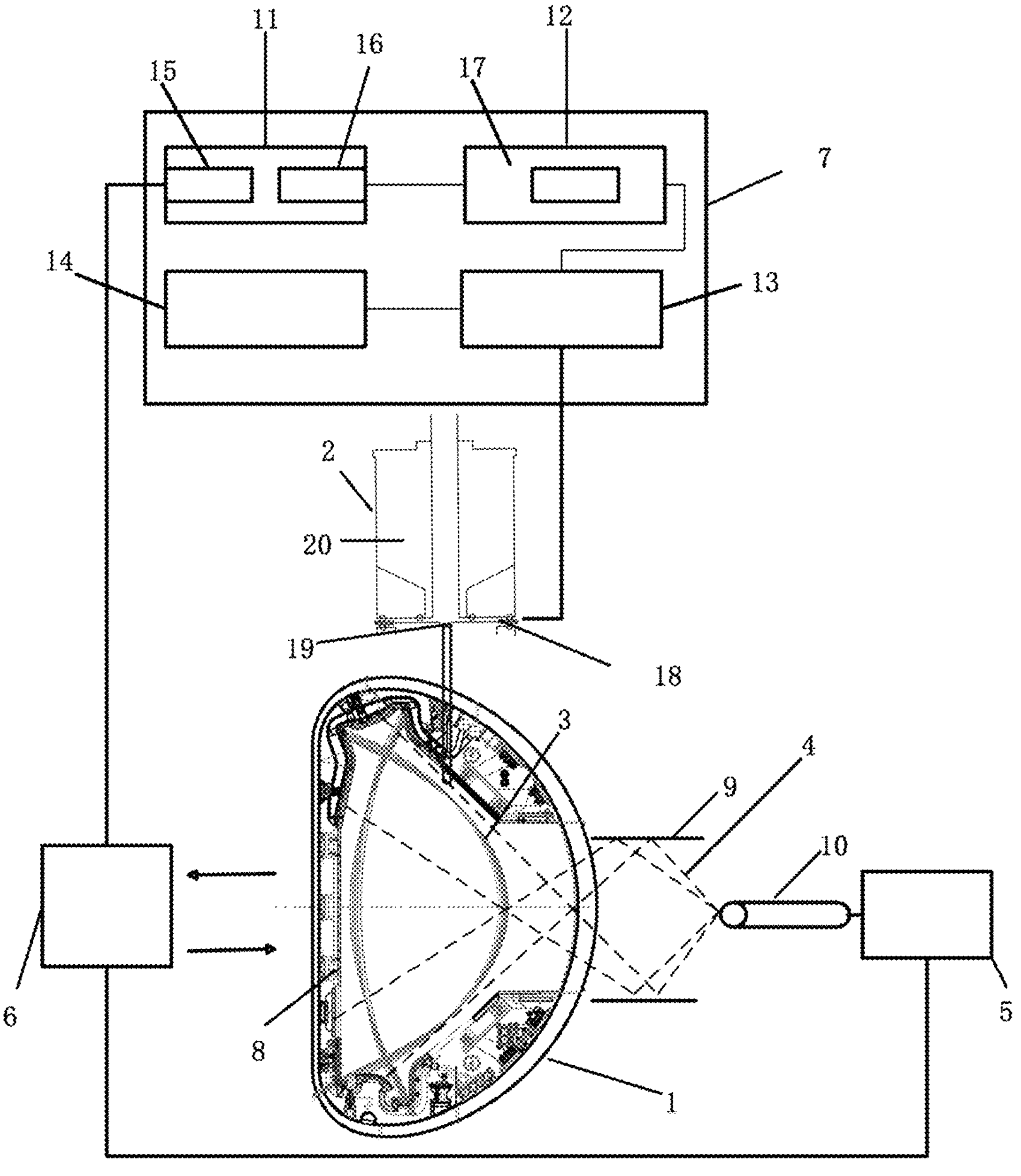
11
12
15
16
17
7
14
13
2
20
19
18
3
4
9
10
6
8
5
1

METHOD FOR CONTROLLING PLASMA EDGE FUEL PARTICLE BACKFLOW BY POWDER FEEDBACK INJECTION

TECHNICAL FIELD

The present disclosure relates to the field of fusion reactors and relates generally to a method for controlling plasma edge fuel particle backflow by powder feedback injection, and more particularly to controlling edge fuel particle backflow by real-time powder feedback injection.

BACKGROUND ART

In the magnetic confinement nuclear fusion device, the strong heat flux and particle flux from the plasma with the high temperature of hundreds of millions degrees cause strong interaction between the particle flux and the wall directly facing the plasma. Part of the fuel particles rebound directly from the wall and re-enter the plasma. Another part of the fuel particles are retained on the wall surface by adsorption, ion implantation, co-deposition, etc., and are released from the wall and then returned into the plasma under the action of the plasma discharge particle and the heat fluxes. The process of these fuel particles re-entering the plasma from the action of the plasma and the wall is called recycling. It directly affects plasma density control, long-pulse high-parameter plasma acquisition and its confinement performance.

Various plasma-facing wall materials and their surface treatment and wall treatment techniques are continually being explored to reduce the release of fuel particles from the plasma wall surface and to reduce the level of particle recycling. The plasma-facing wall materials currently studied in tokamak devices are mainly graphite, tungsten, beryllium and so on. Graphite as a plasma wall material has several disadvantages, such as the need for long-term wall conditioning, chemical corrosion leading to reduced lifetimes, reduced physical and mechanical properties under neutron radiation, dust generation, fragmentation and damage under high heat load when the plasma is disruption, especially severe fuel retention leading to a large release of hydrogen isotopes during plasma discharge. Tungsten is also currently the material selected for the walls, but its widespread use may be affected by its high atomic number, which causes low tolerance content by the plasma, and its chemical attack and high activation by oxygen. Beryllium has a relatively low melting temperature, is potentially toxic, has a relatively high sputtering rate, and has limited applications, typically for plasma wall materials with low energy flux densities. Conventional wall conditionings include baking, DC glow discharge cleaning, ion cyclotron discharge cleaning, etc. The most common method is to raise the wall temperature, but the maximum baking temperature is limited by the scaling material and ambient conditions.

Low-temperature plasma discharge cleaning techniques, such as low-energy DC glow discharge cleaning, and ion cyclotron discharge based on radio frequency technology, can remove fuel particles trapped in the walls. The glow discharge cleaning technology is well established, but it must work when the magnetic field of the device is very small, which severely limits its application in future superconducting tokamak devices. The ion cyclotron discharge cleaning can be used under very strong magnetic field conditions, suitable for the strong magnetic field environment of the superconducting tokamak device. However, these commonly used discharge cleaning techniques have difficulty in achieving complete removal of trapped fuel particles from the walls due to the relatively low power of the discharge cleaning. In order to further improve the compatibility of the wall with the high-temperature plasma and improve particle recycling, it is also necessary to coat the surface of the wall with a layer of low-atomic-number material. The commonly used coating materials are low-atomic-number materials such as silicon, boron and lithium which have good compatibility with the plasma. Meanwhile, EAST has developed a powder injection system that can be used to inject powder in real time during the plasma discharge process for the purpose of improving the wall conditions and thus reducing the level of recycling.

However, these wall conditionging methods can only be performed before the discharge and cannot be performed in real time during the discharge. At present, the method of powder injection can realize real-time recycling control in the discharge process. However, it can only preset the fixed flow value of powder injection, and can not adjust the flow according to the real-time recycling level in the experimental process. In this case, as the plasma pulse length of the fusion device is lengthened, the control of fuel particle recycling becomes more difficult. Because the fuel particles trapped in the wall will reach saturation as the pulse length is lengthened, and will be very easy to be released and re-enter the plasma during the rise fluctuation of the wall temperature, causing particle backflow, enhancing particle recycling, seriously restricting plasma density control in long pulse discharge, and even leading to the termination of discharge. It is difficult to achieve effective control of fuel recycling at the kilosecond long pulse scale by means of the existing first wall conditioning and fixed flow rate of powder injection, which severely limits the achievement of long pulse plasma discharge and the maintenance of steady state.

BRIEF SUMMARY

The present disclosure may remedy, among others, the deficiencies of the prior art by providing a method for controlling plasma edge fuel particle backflow by powder feedback injection to solve the problem of plasma long pulse fuel particle recycling control in fusion devices.

The present disclosure includes, among others, following technical solutions.

Step 1, the real-time Da value is measured by the visible spectrum diagnostic system, wherein the Da value qualitatively reflects the level of fuel recycling.

Step 2, in the plasma control system, the measured Da value is filtered by a low-pass filter, and a target Da value is set at the same time; and when an actual Da value is greater than the set target Da value, an output control voltage signal is calculated according to the PID algorithm formula, the greater the difference value, the greater the output voltage value. The magnitude of the output voltage ultimately determines the magnitude of the lithium powder injection flow rate. When the actual Da value is less than or equal to the set target Da value, the magnitude of the output voltage is 0.

Step 3, the voltage signal input by the PCS is converted into a sine wave signal by an amplitude mapping converter, and the same is output to the lithium powder injection system.

Step 4, the lithium powder injection system receives the voltage signal and injects the lithium powder into the fusion device. The injected lithium powder adsorbs the fuel particles generated by the interaction between the plasma and the wall, so that the backflow of the fuel particles is reduced, and the Da line emission intensity is also reduced. The above steps are repeated until the end of the discharge.

Furthermore, the visible spectrum diagnostic system is provided with reflectors on a upper part and a lower part of a horizontal window of the fusion device for detecting the intensity of the Da line emission at upper and lower divertor regions and part of the inner wall.

Still further, the plasma control system is a control system capable of running a control algorithm to realize plasma parameters on the basis of acquiring plasma parameter diagnostic information; and the PID algorithm formula is $$Y_{(t)} = k_p E(t) + k_i \int_0^t E(t)dt + k_d \frac{dE(t)}{dt},$$

wherein $E(t)=D_{\alpha\_set}-D_{\alpha}(t)$, $D_{\alpha\_set}$ represents a set target value Da and $D_{\alpha}(t)$ represents a value of Da at a moment t. $k_p$, $k_i$, $k_d$ are a proportion, an integral and a difference parameter, respectively; and $Y_{(\tau)}$ is an output voltage value.

Furthermore, the amplitude mapping converter is configured for outputting an input signal as a sine wave signal with an amplitude value being the magnitude of a corresponding voltage value and a specific frequency, and is divided into a signal input module 11, a signal processing module 12, a signal output module 13 and a display module 14, wherein the signal input module comprises a signal isolation amplifier 15 and a resistor voltage division circuit 16, and the voltage value of the input signal is scaled to 0-3.3 V for collection by the signal processing module. The signal processing module collects the input voltage signal, and the collection port 17 collects a point every 10 ms, and then the value of the point is taken as the amplitude of the sine wave signal to generate a sine wave with the amplitude magnitude and the frequency being 2250 HZ. 256 points are generated for each cycle until the next point is collected, and the above-mentioned process is repeated. Th voltage signal input of 0-3.3V is converted into a sine wave voltage signal with a frequency of 2250 Hz and an amplitude value being the magnitude of the input voltage at the corresponding moment after passing through the signal processing module. The signal output module mainly realizes the functions of emitter-follower, filter and amplification of the output sinusoidal signal. The emitting-following and filter circuit is configured for eliminating noise in the generated analogue signal, and the amplification circuit is configured for rescaling the originally scaled voltage value to 0-5 V. The display module is configured for displaying the voltage value and the frequency of the output sine wave signal at the current moment.

Furthermore, the core component of the lithium powder injection system is a piezoelectric ceramic piece 18 with a small circular hole 19 in the middle: a bottom-through cylindrical container 20 for storing lithium powder is located above the piezoelectric ceramic piece; and a conduit leading to the fusion device is connected below the piezoelectric ceramic piece. When a sine wave voltage is applied to the piezoelectric ceramic piece for vibration, the lithium powder slides towards the small circular hole and into the fusion device. The amplitude value of the sine wave voltage signal affects the vibration amplitude of the ceramic piece, thereby affecting the flow rate of lithium powder injection.

The disclosure has the advantages below.

The present disclosure controls the edge fuel particle backflow by the the powder injection, and automatically adjusts a flow rate of the powder injection according to the real-time recycling level during the plasma discharge process so as to achieve real-time control of the fuel recycling. On the one hand, when the recycling level is low, the waste caused by excessive powder injection can be avoided. On the other hand, when the recycling level continues to rise, the powder injection flow rate can be increased, and the recycling level can be reduced, so as to reduce the backflow of fuel particles in the plasma discharge process, promote the realization of the scientific objectives of fusion devices and develop new ideas for the fuel particle control of the future fusion devices.

BRIEF DESCRIPTION OF THE DRAWINGS

FIG. 1 is a flow diagram of a method for controlling plasma edge fuel particle backflow by powder feedback injection in accordance with the present disclosure:

In the drawings, 1. fusion device: 2. lithium powder injection system: 3. plasma: 4. Da line emission: 5. visible spectrum diagnostic system: 6. plasma control system (PCS): 7. amplitude mapping converter: 8. wall.

DETAILED DESCRIPTION OF THE EMBODIMENTS

The following is a clear and complete description of the technical solution in the embodiments of the present disclosure in combination with the drawings in the embodiments of the present disclosure. Obviously, the embodiments described are only a part of the embodiments of the present disclosure, but not all the embodiments. Based on the embodiments of the present disclosure, all other embodiments obtained by ordinary technicians in the field without creative labor belong to the protection scope of the present disclosure.

As shown in FIG. 1, a method for controlling plasma edge fuel particle backflow by powder feedback injection according to the present disclosure comprises a fusion device 1, a plasma 3, a visible spectrum diagnostic system 5, a plasma control system (PCS) 6, a wall 8, an amplitude mapping converter 7 and a lithium powder injection system 2. The fusion device 1 is a magnetically confined fusion reaction device, and the plasma 3 is generated and maintained in the fusion device 1. The Da line emission 4 is the radiation emitted by deuterium atoms upon transition from an excited state and is used to characterize edge fuel particle levels of the plasma 3. The visible spectrum diagnostic system 5 is provided with reflectors 9 on a upper part and a lower part of a horizontal window of the fusion device 1 for detecting 10 the intensity of the Da line emission 4 at upper and lower divertor regions and part of the inner wall. A control algorithm runs on the plasma control system (PCS) 6 to realize feedback control on the plasma 3 on the basis of acquiring parameter diagnostic information of the plasma 3: the wall 8 is a chamber wall facing the plasma 3 in the fusion device 1, and the amplitude mapping converter 7 is configured for converting an output signal of the plasma control system 6 into a sine wave signal with an amplitude value being the magnitude of a corresponding voltage value and a specific frequency. The lithium powder injection system 2 is arranged at the top of the fusion device 1, and injects lithium powder into the fusion device after receiving the output signal of the amplitude mapping converter 7. The lithium powder injection system 2 is successively connected to the amplitude mapping converter 7, the plasma control system (PCS) 6 and the visible spectrum diagnostic system 5.

The amplitude mapping converter 7 is configured for outputting an input signal as a sine wave signal with an amplitude value being the magnitude of a corresponding voltage value and a specific frequency, and is divided into a signal input module 11, a signal processing module 12, a signal output module 13 and a display module 14, wherein the signal input module comprises a signal isolation amplifier 15 and a resistor voltage division circuit 16, and the voltage value of the input signal is scaled to 0-3.3V for collection by the signal processing module. The signal processing module collects an input voltage signal, a collection port 17 collects a point every 10 ms, and then the value of the point is taken as the amplitude value of a sine wave signal to generate a sine wave with the amplitude value and the frequency being 2250 Hz all the time: 256 points are generated for each cycle until the next point is collected, and the above-mentioned process is repeated. The voltage signal input of 0-3.3V is converted into a sine wave voltage signal with a frequency of 2250 Hz and an amplitude value being the magnitude of the input voltage at the corresponding moment after passing through the signal processing module. The signal output module mainly realizes the functions of emitter-follower, filter and amplification of the output sinusoidal signal. The emitting-following and filter circuit is configured for eliminating noise in the generated analogue signal, and the amplification circuit is configured for rescaling the originally scaled voltage value to 0-5 V. The display module is configured for displaying the voltage value and the frequency of the output sine wave signal at the current moment.

The core component of the lithium powder injection system 2 is a piezoelectric ceramic piece 18 with a small circular hole 19 in the middle: a bottom-through cylindrical container 20 for storing lithium powder is located above the piezoelectric ceramic piece; and a conduit leading to the fusion device is connected below the piezoelectric ceramic piece. When a sine wave voltage is applied to the piezoelectric ceramic piece for vibration, the lithium powder slides towards the small circular hole and into the fusion device. The amplitude value of the sine wave voltage signal affects the vibration amplitude of the ceramic piece, thereby affecting the flow rate of lithium powder injection.

Before the discharge starts, start time and end time for control algorithm execution are set in the plasma control system (6). During the discharge process, the intensity of the real-time Da line emission 4 is measured by the visible spectrum diagnostic system 5, and the magnitude of the intensity of the Da line emission 4 characterizes the level of recycling during the interaction between the plasma 3 and the wall 8. The plasma control system (PCS) 6 obtains the discharge start time of the fusion device 1, sets 1.5 times of the intensity of the Da line emission 4 3 s after the discharge start as a target value, and filters the measured Da value by a low-pass filter during the execution of the control algorithm. When the actual intensity of the Da line emission 4 is greater than the target value, the magnitude of the output voltage is calculated according to the PID algorithm formula. The PID algorithm formula is $$Y_{(t)} = k_p E(t) + k_i \int_0^{\tau} E(t)dt + k_d \frac{dE(t)}{dt},$$

wherein $E(t)=D_{\alpha\_set}-D_{\alpha}(t)$, $D_{\alpha\_set}$ represents a set target value Da, and $D_{\alpha}(t)$ represents a value of Da at a moment t; $k_p$, $k_i$, $k_d$ are a proportion, an integral and a difference parameter, respectively; and $Y_{(\tau)}$ is an output voltage value.

The magnitude of the output voltage ultimately determines the magnitude of the flow rate of lithium powder injected into the lithium powder injection system 2. When the actual Da value is less than or equal to the set target Da value, the magnitude of the output voltage is 0, namely, the lithium powder injection system 2 does not inject lithium powder, and continuously outputs a signal of a voltage value with a corresponding magnitude to the amplitude mapping converter 7 according to the calculated value. After the amplitude mapping converter 7 receives the voltage signal transmitted by the plasma control system (PCS) 6, the collection port collects a point every 10 ms, and then the value of the point is taken as the amplitude of the sine wave signal to generate a sine wave with the amplitude magnitude and the frequency being 2250 HZ. 256 points are generated for each cycle until the next point is collected, and the above-mentioned process is repeated. Finally, it is converted into converted into a sine wave voltage signal with a frequency of 2250 Hz and an amplitude value being the magnitude of the input voltage at the corresponding moment, and output to the lithium powder injection system 2. The lithium powder injection system 2 receives the sine wave voltage signal. The magnitude of the sine wave voltage signal determines the flow rate of lithium powder injected into the fusion device 1. The injected lithium powder adsorbs the fuel particles generated by the interaction between the plasma 3 and the wall 8, so that the backflow of the fuel particles is reduced, and the Da line emission 4 intensity is also reduced. The above steps are repeated until the end of the control algorithm. By the above method, the flow rate of lithium powder injection is controlled according to the recycling level feedback of fuel particles characterized by the intensity of Da line emission 4, and the recycling of fuel particles is controlled by means of lithium powder feedback injection, which provides a new technical support for high-parameter, long-pulse steady-state operation of fusion devices.

Although the illustrative embodiments of the present disclosure have been described above for purposes of clarity of understanding to those of ordinary skill in the art, it should be understood that the present disclosure is not limited to the detailed description, and that various changes may be made which are obvious to those of ordinary skill in the art without departing from the spirit and scope of the present disclosure as defined and defined by the appended claims. All disclosures and creations utilizing the idea of the present disclosure fall in the protection scope of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling plasma edge fuel particle backflow by powder feedback injection using a system, the system comprising a fusion device, a visible spectrum diagnostic system, a plasma control system, a wall, an amplitude mapping converter and a lithium powder injection system; the fusion device being a magnetically confined fusion reaction device; the visible spectrum diagnostic system including reflectors on a upper part and a lower part of a horizontal window of the fusion device; the plasma control system including a control algorithm configured to implement feedback control on a plasma based on acquired parameter diagnostic information of the plasma; the wall being a chamber wall facing the plasma in the fusion device, the amplitude mapping converter configured to convert an output voltage signal of the plasma control system into a sine wave signal; the lithium powder injection system being arranged at a top of the fusion device, and configured to inject lithium powder into the fusion device after receiving an output signal of the amplitude mapping converter; the lithium powder injection system being successively connected to the amplitude mapping converter, the plasma control system and the visible spectrum diagnostic system; the method comprising:

setting a start time and an end time for control algorithm execution in the plasma control system;

after the setting the start time and the end time, generating and maintaining, by the fusion device, a plasma discharge;

during the plasma discharge, measuring a Da value of Da line emission in real-time by the visible spectrum diagnostic system, the Da value being measured as an intensity of the the Da line emission at upper and lower divertor regions of the fusion device and at part of the an inner wall of the wall, the Da value reflecting a level of fuel recycling during an interaction between the plasma and the wall, the Da line emission being radiation emitted by deuterium atoms upon transition from an excited state and indiucating an edge fuel particle level of the plasma;

filtering, by the plasma control system, the measured Da value by a low-pass filter, and comparing the measured Da value with a set target Da value;

when the measured Da value is greater than the set target Da value, calculating an output voltage value of the output voltage of the plasma control system according to an PID algorithm formula of the control algorithm, the output voltage value being positively related to a difference value between the measured Da value and the set target Da value, wherein the output voltage value ultimately determines a magnitude of a flow rate of the lithium powder injected into the fusion device, the PID algorithm formula being $$Y_{(t)} = k_p E(t) + k_i \int_0^t E(t)dt + k_d \frac{dE(t)}{dt},$$

wherein $E(t)=D_{\alpha\_set}-D_{\alpha}(t)$, wherein $D_{\alpha\_set}$ represents a set target value Da, and $D_{\alpha}(t)$ represents a value of Da at a moment t; $k_p$, $k_i$, $k_d$ are a proportion, an integral and a difference parameter, respectively, and $Y_{(\tau)}$ is an output voltage value;

when the measured Da value is less than or equal to the set target Da value, determining the output voltage value to be 0;

converting, by the amplitude mapping converter, the output voltage of the plasma control system into the sine wave signal with an amplitude value being a magnitude of the output voltage value and with a frequency, and outputting the sine wave signal to the lithium powder injection system; and injecting, by the lithium powder injection system, lithium powder into the fusion device based on the sine wave signal, wherein the lithium powder injected into the fusion device adsorbs fuel particles generated by the interaction between the plasma and the wall, so that backflow of the fuel particles is reduced, and the Da line emission intensity is also reduced.

2. The method for controlling the plasma edge fuel particle backflow by the powder feedback injection according to claim 1, wherein:

the amplitude mapping converter includes a signal input module, a signal processing module, a signal output module and a display module;

the signal input module includes a signal isolation amplifier and a resistor voltage division circuit, and the method further comprises, scaling the output voltage value to 0-3.3V;

collecting the output voltage of the plasma control system in the signal processing module every 10 ms, wherein the collecting generates 256 points for each cycle until a next point is collected;

generating the sine wave signal with an amplitude value of the collected output voltage of the plasma control system and a frequency of 2250 Hz;

converting the scaled output voltage of 0-3.3V into the sine wave signal with the frequency of 2250 Hz and the amplitude value being the magnitude of the collected output voltage value at a corresponding moment after passing through the signal processing module;

emitting-following, filtering and amplifying the sine wave signal in the signal output module;

rescaling the originally scaled voltage value to 0-5 V; and displaying the voltage value and the frequency of the sine wave signal at a current moment in the display module.

3. The method for controlling the plasma edge fuel particle backflow by the powder feedback injection according to claim 1, wherein the lithium powder injection system includes:

a piezoelectric ceramic piece with a circular hole in the middle;

a bottom-through cylindrical container for storing lithium powder located above the piezoelectric ceramic piece, and a conduit leading to the fusion device and connected below the piezoelectric ceramic piece;

wherein when the sine wave signal is applied to the piezoelectric ceramic piece for vibration, the lithium powder slides towards the circular hole and into the fusion device, and the amplitude value of the sine wave signal affecting vibration amplitude of the ceramic piece, thereby affecting the flow rate of lithium powder injection.

* * * * *